United States Patent Office 3,160,595
Patented Dec. 8, 1964

3,160,595
CURING SYSTEM FOR DEPOLYMERIZED
POLYISOPRENE RUBBER
Kenneth V. Hardman, Upper Montclair, and Arthur J. Lang, Cedar Grove, N.J., assignors to DPR, Incorporated, a corporation of New Jersey
No Drawing. Filed Aug. 30, 1961, Ser. No. 134,820
10 Claims. (Cl. 260—2.3)

This invention relates to a new curing system for depolymerized polyisoprene rubbers.

It has now been discovered that p-quinonedioxime in combination with lead dioxide is effective for curing depolymerized polyisoprene rubber at room temperature without sulfur. Curing at room temperature is of decided advantage in many applications as for example where it is desirable to use uncured liquid depolymerized rubber as a sealant. In such case the liquid may be poured into the voids to be sealed and then cured in situ without application of heat. The cure at room temperature is quite rapid and when properly compounded a one pound mass of the liquid depolymerized polyisoprene rubber will be completely cured in about one hour after addition of the p-quinonedioxime-lead dioxide reagents.

Practically no shrinkage or internal contraction is exhibited during cure which is of advantage in certain electronic applications where change in impedance is undesirable and the cured rubber remains flexible at minus 40° F. and yet it may be effectively used at 180° F. over prolonged periods of time. Ozone resistance is about three times better than that of standard pure gum rubber molded and cured in conventional manner. Curing time may of course be varied to accommodate the work at hand by change in formulation.

Quite unexpectedly it has now been found that the p-quinonedioxime-lead dioxide curing system provides a self limiting cure in that a soft rubber is produced which upon exposure to air exhibits surface tack. Regardless of the amount of p-quinonedioxime-lead dioxide employed it has not been possible to cure the depolymerized rubber to a dry fully cured rubbery state exhibited by conventionally cured soft rubbers and the completely cured rubber is always soft with charactetristic tack on those surfaces exposed to air. The surface tack is persistent and it cannot be destroyed by adding the usual oxidizing reagents but if exposed to actinic light the surface tack will gradually decrease. However, if the surface tack is undesirable it may be substantially eliminated as hereinafter specified.

The surface tack is an extremely important feature of the cured product of the present invention which causes the cured rubber to "cling" so that it tends to stay put when cured in contact with other materials. When not exposed to actinic light rays the surface tack will last for months and this is of special advantage since with proper compounding the cured product makes an excellent pressure sensitive adhesive. The maximum hardness of the cured soft rubber which can be achieved with the curing system of the present invention is about 70 on the Shore A hardness scale and by employing controlled amounts of curing reagents and fillers resilient rubbery gels may be produced.

As to materials, the depolymerized polyisoprene rubber used in carrying out the present invention is a standard article of commerce. It may be prepared by masticating solid polyisoprene rubber in conventional milling equipment until the solid is soft and dough like. Heat accelerates the depolymerization and solid polyisoprene rubber when milled at 500° F. will turn to a free flowing liquid at the end of six hours. The term "depolymerized polyisoprene rubber" as used in the specification and claims is intended to mean either natural or synthetic polyisoprene rubber which without volatiles has a viscosity of not more than about 1,500,000 cps. at 68° F. as measured by a standard Brookfield viscometer. At this viscosity the rubber is soft and flowable and the character of the polymer is such that it may be successfully cured to a soft rubber with surface tack in accordance with the present invention. The specified maximum viscosity is a critical feature of the present invention and if the viscosity of the rubber exceeds the specified maximum to any appreciable extent curing can not be controlled and the cured product will not have the soft rubber characteristics and surface tack necessary for commercial utility. For a free flowing liquid which may be readily poured the viscosity of the depolymerized rubber may be in the neighborhood of 225,000 cps. at 68° F. and, of course, lower viscosities may be employed in accordance with the present invention. If desired conventional diluents or non-volatile liquid extenders may be added to the depolymerized polyisoprene rubber but in order to realize the benefits of the present invention the rubber to which the diluent or liquid extender is added must have a viscosity at or below the above specified maximum.

Out of the many dioximes available, it is only the para-quinonedioxime that can be used in the curing system of the present invention. Although esters and salts of the para-quinonedioxime have been tried it has not been possible to achieve a practical commercial cure with such salts or esters.

Lead dioxide is the only metal oxide which can be employed in carrying out the present invention. The other oxdes of lead and oxides of other metals are not satisfactory since the cure, if any, which may be effected with these reagents is far too slow for practical commercial use.

The proportions of curing reagents may be varied over a wide range but in general about 5 parts by weight of p-quinonedioxime and about 7.5 parts by weight of lead dioxide for each 100 parts by weight of depolymerized polyisoprene rubber will effect a complete cure to provide the soft rubber with surface tack of the present invention. An excess of curing reagents over this may be employed to accelerate the rate of cure but the resulting product will still be the soft rubber with surface tack of the present invention. A decrease in the amount of curing reagents will slow the cure down and the cured product will be softer and have greater surface tack which is of advantage in certain applications.

As in conventional practice fillers are employed in compounding the deploymerized polyisoprene rubber of the present invention and varying proportions may be employed. Bulk fillers include silica, clays and calcium carbonate. The weight of filler employed may exceed that of the depolymerized polyisoprene rubber. Zinc oxide and zinc sulfide are helpful where light color is desired. For troweling compounds useful in sealing cracks the usual thixotropic fillers such as Co-O-Sil, Bentonite or Santocel are employed. Other fillers of the so called speciality types such as carbon black, acetylene black, finely divided aluminum and glass fibers may be employed to build the desired physical characteristics into the cured product. It will be understood, however, that fillers are not necessary and the depolymerized polyisoprene rubber may be cured with the p-quinonedioxime-lead dioxide system without the addition of fillers.

In the examples and throughout the specification and claims proportions are given as parts by weight unless otherwise specified. In the examples viscosity is in all cases measured in a standard Brookfield viscometer.

EXAMPLE 1

This example illustrates a composition which has been found to be useful as a potting compound and sealant in cable construction.

40 parts of depolymerized polyisoprene rubber having a viscosity of 225,000 cps. at 68° F. were mixed with 2 parts of p-quinonedioxime, 4 parts of lead dioxide, 30 parts of calcium carbonate, 8 parts of d'Limonene and 0.8 parts of triethanolamine. The order of adding the various ingredients to the mixing kettle is not important but best results are achieved by adding the ingredients in the order in which they are set forth hereinabove. The mixing kettle employed was a conventional one for compounding liquid rubber and in this example a Hobart mixer was used. Mixing was carried out at room temperature for about fifteen minutes at the end of which time the batch was uniformly mixed. The batch was removed from the mixing kettle and poured out into molds employed for testing. It was noted that the consistency reached a string free gel state in eight minutes at room temperature establishing its workable pot life. Fifteen hours later the rubber was firm with a tacky surface, the cure being substantially complete. A test of Shore hardness showed that the resulting cured rubber had a Shore hardness on the A scale of 20, and the exposed surface of the rubber exhibited a very definite tack. After standing two days the Shore hardness had gone up 5 points and the surface tack was substantially the same. This showed that the rubber had substantially reached complete cure at the time of the first test of Shore hardness.

EXAMPLE 2

In this example the procedure and ingredients of Example 1 were employed except that 4 parts of p-quinonedioxime and 8 parts of lead dioxide were employed.

The compounding and curing of the mixed batch was carried out in accordance with the procedure described in Example 1. The resulting cured rubber was tested after it had substantially reached complete cure and it was found to have a Shore hardness on the A scale approximately that of the cured rubber of Example 1. The surface tack of exposed surfaces of the cured rubber of this example was essentially the same as in the case of the sample of Example 1. The cure had not advanced beyond the soft rubber stage of Example 1 even though twice the amount of curing agents were employed.

EXAMPLE 3

This example illustrates a composition useful as a pressure sensitive adhesive.

| Ingredients: | Parts |
| --- | --- |
| Depolymerized polyisoprene rubber having a viscosity of 950,000 cps. at 68° F. | 100 |
| p-Quinonedioxime | 5 |
| Lead dioxide | 7.5 |
| Mineral oil | 50 |
| Zinc oxide | 100 |
| Triethanolamine | 2.0 |

The ingredients were mixed as described in Example 1 and then the batch was spread out with a doctor blade on a paper backing and cured in an oven at 250° F. Cure was accomplished in three minutes and the surface tack of the cured rubber was at least comparable to that of the conventional commercial pressure sensitive adhesive tapes. The cured rubber was covered with Holland cloth as is conventional in the art and when subsequently stripped off the rubber tenaciously clung to a metal surface.

The triethanolamine $N(CH_2 \cdot CH_2 \cdot OH)_3$ accelerator is of particular merit as this materially increases the rate of cure. For example, in a batch with the ingredients and proportions of ingredients specified above in this Example 3 but without the triethanolamine the compounded rubber when spread out would require about ten minutes to cure at a temperature of 250° F. In our work we have found that curing is accelerated by the triethanolamine when used in proportion up to about 4% by weight of the depolymerized polyisoprene rubber. An excess over the specified amount gives such a rapid cure at room temperatures that it does not have a long enough pot life for most commercial applications.

If desired the usual plasticizers conventionally used in pressure sensitive adhesives may be employed with the depolymerized polyisoprene rubber of the present invention. These include non-oxidizing plasticizers such as the hydrogenated methyl ester of resin sold under the trade name Hercolyn or triethylene glycol ester of hydrogenated rosin sold under the trade name Staybelite Ester No. 3. These plasticizers materially improve surface tack which is of advantage in a pressure sensitive adhesive.

The mineral oil used in the composition of this Example 3 also tends to improve the surface tack of the cured product and any conventional non-drying or non-oxidizing oil which is compatible with the rubber may be employed. Surprisingly enough the mineral oil was also effective for materially increasing the speed of cure and it has now been found that any low viscosity miscible liquid is effective for such purpose. d'Limonene is particularly effective for such purpose. d'Limonene is obtained by steam distilling orange or grapefruit peel. The compound is a liquid ($C_{10}H_{16}$) and it is isomeric with natural rubber. When added to depolymerized polyisoprene rubber it reduces the viscosity of the rubber and in compounding it serves as a liquid extender. Another advantage of using a liquid extender such as the d'Limonene or lard oil is that the viscosity of the compounded depolymerized polyisoprene rubber may be reduced to a desired level for application as a liquid for penetrating voids and yet the cured product exhibits improved hardness. It will be understood that the mineral oil, triethanolamine and zinc oxide used in this Example 3 are not necessary for the manufacture of a pressure sensitive adhesive as a low viscosity depolymerized polyisoprene rubber cured with the p-quinonedioxime-lead dioxide system alone is useful for such purpose.

EXAMPLE 4

This example illustrates a basic formulation which when cured makes a good sealant for cables and connectors, potting compounds and shock absorbents. During cure the rubber exhibits little shrinkage or internal contraction. The following ingredients were compounded as specified in Example 1 in the following proportions:

| Ingredients: | Parts |
| --- | --- |
| Depolymerized polyisoprene rubber having a viscosity of 200,000 cps. at 68° F. | 100 |
| p-Quinonedioxime | 5 |
| Lead dioxide | 10 |
| Silica | 100 |
| d'Limonene | 20 |
| Triethanolamine | 2 |

When compounding is completed to provide a uniform mass the compounded material remains fluid enough to be poured for a period of about ten minutes at room temperature. As vulcanization proceeds it is accompanied by the usual increase of viscosity. After about two hours the final curing levels off and for all practical purposes reaches a maximum in twenty hours at room temperature.

EXAMPLE 5

The following example illustrates a composition which in use has proven to be an excellent general all purpose sealant. For such purpose we have found it particularly useful to divide the composition into two parts, Part A and Part B. In this way the material may be conveniently stored until ready for use and as described in copending application Serial Number 126,950 filed July 26, 1961 where a particularly effective package is described. The package provides the user with a convenient quantity of the depolymerized polyisoprene rubber for the job at hand. The formulation is as follows:

*Part A*

| Ingredients: | Parts |
|---|---|
| Depolymerized polyisoprene rubber having a viscosity of 190,000 cps. at 68° F. | 100 |
| p-Quinonedioxime | 5 |
| Calcium carbonate (Atomite) | 65 |
| d'Limonene | 15 |
| Triethanolamine | 2 |

*Part B*

| Ingredients: | Parts |
|---|---|
| Lead dioxide | 10 |
| Dibutylphthalate | 5 |

Part A and Part B are separately mixed in conventional equipment to provide a uniform homogenous mixture of the ingredients. Best results are achieved by adding the dry fillers and p-quinonedioxime to the depolymerized polyisoprene rubber first and these are then mixed to a smooth dispersion free of agglomerates. Thereafter the liquid constitutents d'Limonene and triethanolamine are added and mixed into the batch. Frictional heat is generated because of mixing which lowers the viscosity of Part A and if desired heat can be applied to warm the batch and lower its viscosity for ease in mixing. The Part A in use has been found to remain stable as to viscosity and potency for months at ordinary storage temperatures both in summer and winter.

As to Part B, the lead dioxide is preferably first wetted with the dibutylphthalate and these two are most conveniently mixed in a conventional three roll paint mill but other simple agitation of the paste is satisfactory for mixing. Some separation of the dibutylphthalate may take place in this Part B upon prolonged standing but this is not objectionable since once Part B is added to Part A the two are stirred to insure uniform mixing for cure.

In this example 100 parts by weight of Part A are employed with 8 parts by weight of Part B for the best results. It has been found that the d'Limonene for some unexplained reason increases the tendency of the cured product to adhere to polyethylene and this makes the composition particularly useful as a sealant in cable construction where polyethylene is employed. The dibutylphthalate wets the lead dioxide powder to assist in mixing.

EXAMPLE 6

This example illustrates a highly fluid composition which is particularly useful as a cable sealant where it is desirable to penetrate into small interstices within the cable. The following ingredients were mixed as specified in Example 1 in the following proportions:

| Ingredients: | Parts |
|---|---|
| Depolymerized polyisoprene rubber having a viscosity of 225,000 cps. at 68° F. | 100 |
| p-Quinonedioxime | 5 |
| Lead dioxide | 10 |

When compounding of the above ingredients was completed the batch was drained into containers and the pot life of the batch was two hours at room temperature. This was of advantage to allow time to apply or force the compound into the interstices of a cable. At the end of the two hour period the batch had cured to a gel state which exhibited high surface tack.

EXAMPLE 7

This example illustrates the way in which the characteristic surface tack of the soft rubber of the present invention may be substantially eliminated. This was done by blending a minor proportion of a synthetic resin into the depolymerized polyisoprene rubber. The following procedure and proportion of ingredients were employed for eliminating surface tack:

| Ingredients: | Parts |
|---|---|
| Depolymerized polyisoprene rubber having a viscosity of 225,000 cps. at 68° F. | 80 |
| Low molecular weight polyethylene resin | 20 |
| p-Quinonedioxime | 5 |
| Lead dioxide | 7.5 |
| d'Limonene | 15 |

In this example the depolymerized rubber and polyethylene were first added to the mixing kettle. Heat was applied to bring the temperature of the batch to 275° F. which caused the polyethylene to melt which was thereupon homogenous with the depolymerized rubber by means of gentle agitation. The batch was thereafter allowed to cool down to room temperature whereupon the remaining ingredients were added as specified in Example 1. These were then compounded in conventional manner and the batch was then poured out into test molds and allowed to stand at room temperature. In three hours the rubber was substantially cured to a soft rubber product and the cured rubber at first exhibited the characteristic tack. The cured product was allowed to stand at room temperature for twelve hours and upon subsequent testing the surface tack had been substantially eliminated.

It will be understood that the rubber of the present invention may be employed as is customary with the known commercial forms of rubber. Thus, the rubber may be blended with synthetic resins or other known materials in order to impart the beneficial characteristics of the rubber to such material. In doing this it is frequently the case that the rubber is blended in an uncured form and thereafter cured in situ. The full scope of utility of the soft rubber of the present invention has not as yet been determined.

It will be understood that it is intended to cover all changes and modifications of the preferred form of invention herein chosen for the purpose of illustration which do not depart from the spirit and scope of the invention.

What we claim is:

1. The method of curing depolymerized polyisoprene rubber which comprises depolymerizing solid polyisoprene rubber until the viscosity is no greater than about 1,500,000 cps. at 68° F. as measured in a standard Brookfield viscometer and thereafter adding p-quinonedioxime and lead dioxide to the depolymerized polyisoprene rubber to cure it to a soft rubber state having a Shore hardness on the A scale not greater than about 70.

2. The method specified in claim 1 which includes the step of maintaining the depolymerized polyisoprene rubber at room temperature during cure.

3. The method specified in claim 1 which includes the step of adding a filler to the depolymerized polyisoprene rubber prior to the curing step.

4. The method specified in claim 1 which includes the step of adding a liquid extender to the depolymerized rubber prior to the curing step.

5. The method specified in claim 4 which includes the step of selecting the liquid extender from the group consisting of mineral oil, lard oil, dibutyl phthalate and limonene.

6. The method specified in claim 1 which includes the step of adding an accelerator to the depolymerized polyisoprene rubber prior to the curing step.

7. The method specified in claim 6 in which the selected accelerator is triethanolamine.

8. The method specified in claim 1 which includes the step of adding a plasticizer to the depolymerized polyisoprene rubber prior to the curing step in order to increase the tack of the cured product and provide a cured product especially adapted for use as a pressure sensitive adhesive.

9. A depolymerized polyisoprene soft rubber free of sulfur and cured with p-quinonedioxime and lead dioxide, said rubber exhibiting a definite tack on surfaces thereof exposed to the atmosphere and having a Shore hardness on the A scale not greater than about 70.

10. A depolymerized polyisoprene soft rubber in accordance with claim 9 which includes a minor proportion of low molecular weight polyethylene resin therein.

References Cited in the file of this patent

UNITED STATES PATENTS

| | | |
|---|---|---|
| 2,170,191 | Fisher | Aug. 22, 1939 |
| 2,369,471 | Latham | Feb. 13, 1945 |
| 2,393,321 | Haworth | Jan. 22, 1946 |

FOREIGN PATENTS

| | | |
|---|---|---|
| 622,914 | Great Britain | May 10, 1949 |